June 4, 1940.    G. A. ELLESTAD    2,203,408
OPHTHALMIC MOUNTING
Filed Feb. 8, 1937
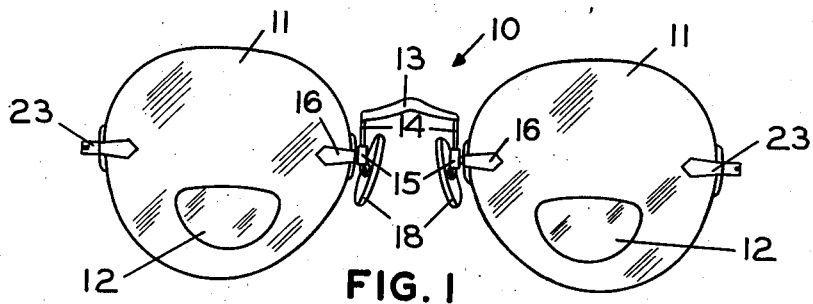
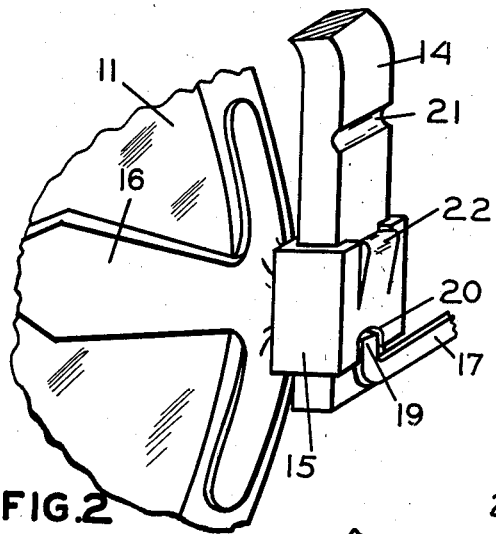
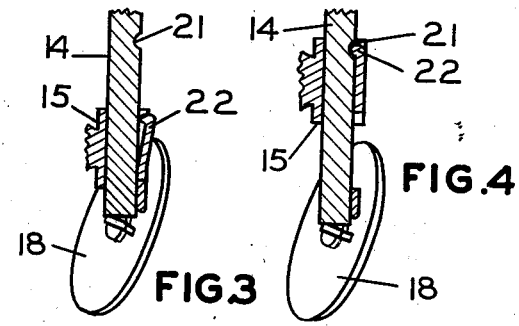
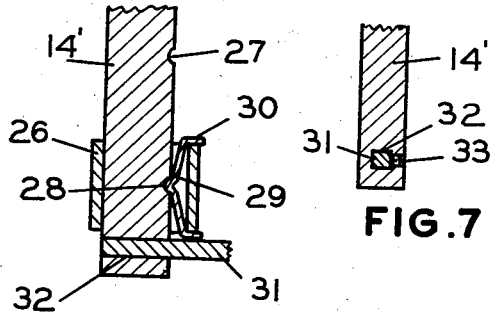
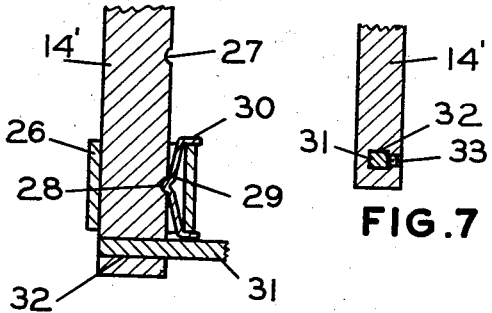
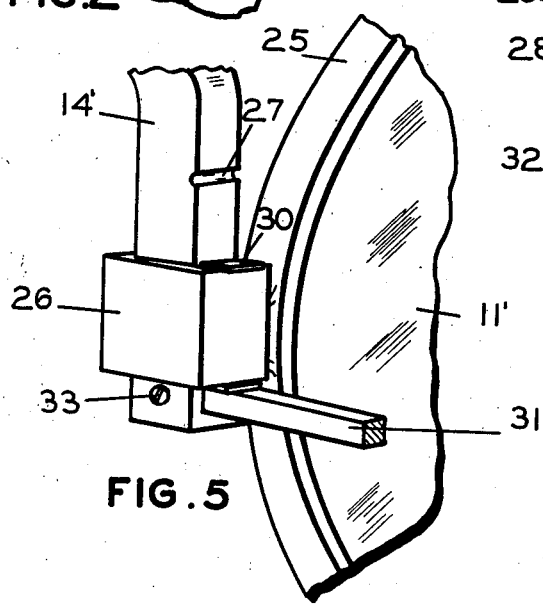
Gerhard A. Ellestad
INVENTOR.

Patented June 4, 1940

2,203,408

UNITED STATES PATENT OFFICE 2,203,408

OPHTHALMIC MOUNTING

Gerhard A. Ellestad, Rochester, N. Y., assignor to Bausch & Lomb Optical Company, Rochester, N. Y., a corporation of New York Application February 8, 1937, Serial No. 124,601

1 Claim. (Cl. 88—49)

This invention relates to ophthalmic mountings and more particularly it has reference to spectacles which embody multifocal lenses having portions used for near vision and portions used for distant vision. In such types of lenses, as bifocals, for example, the reading portion is usually relatively small in area and is placed at the lower part of the lens, thus leaving the upper portion unrestricted for distant vision. With the near vision portions thusly positioned, it is necessary for the wearer, when reading, to tilt his head backwards and look downwardly so that his lines of vision will pass through the near vision portions. Such positions are awkward and tiresome and to overcome these disadvantages it has been proposed to make spectacles in which the nose pads and lenses are relatively movable vertically so as to permit selective positioning of the near and distant vision portions before the eyes of the wearer. Mountings and frames of this type have, as far as I am aware, been relatively complicated in structure and rather unsightly in appearance.

One of the objects of the present invention is to provide an ophthalmic mounting which will be relatively simple in structure and yet embody means for adjustably positioning the nose-engaging members with respect to the lenses. Another object is to provide such a mounting which will be relatively simple to manufacture, present a neat appearance and be adapted for convenient use. A further object is to provide an ophthalmic mounting having a bridge member with lens holding means slidably mounted thereon. Further objects and advantages reside in certain novel features of construction, arrangement and combination of parts as will hereinafter be more fully described and pointed out in the appended claim.

Referring to the drawing:

Fig. 1 is a front view of a pair of rimless spectacles embodying my invention.

Fig. 2 is an enlarged fragmentary view showing the bridge and lens strap connections of same.

Fig. 3 is a fragmentary sectional view showing the bridge and sliding lens holder with the latter in the lower position.

Fig. 4 is a similar view but showing the lens holder at its proper position.

Fig. 5 is an enlarged fragmentary view of a modified construction shown attached to an eyewire.

Fig. 6 is a sectional view of the bridge and connection of Fig. 5.

Fig. 7 is a sectional view of a detail of Fig. 5.

One embodiment of my invention is shown in Figs. 1–4 wherein 10 indicates, generally, a pair of rimless spectacles comprising the two bifocal lenses 11 having reading portions 12. The lenses are connected by a bridge member 13 having spaced vertical sides 14 on each of which is slidably mounted a rectangular tubular member 15 carrying the lens strap 16 connected to lens 11. A rearwardly extending arm 17, carrying a nose-engaging pad 18, is soldered to each side portion 14 adjacent the end thereof. The arm 17 preferably has an upturned projection 19 which is adapted to engage a notch 20 in the wall of member 15 when the latter is down at its lower position, as shown in Fig. 2. The inner face of each bridge side 14 is provided with a notch 21 which is adapted to be engaged by the resilient tongue 22 carried by member 15 for holding the latter, and the lens it carries, in a raised position as shown in Fig. 4. The lenses 11 carry the usual endpieces 23 for pivotally supporting temples, not shown.

It will be apparent, from the foregoing description, that the lenses 11 are slidably mounted on the sides 14 of the bridge 13 so that, with the bridge and nose pads 18 in a fixed position, the lenses may be selectively raised or lowered. No auxiliary bridge member is employed to connect the two sliding members 14 and hence the mounting is relatively simple in structure and presents a neat apearance. In the position shown in Fig. 1 the lenses are adapted for use of the distant vision portions. When the wearer wishes to read, he holds the bridge 13 in place and raises each lens 11 upward until the resilient tongue 22 engages the notch 21. The upturned end 19 on arm 17 cooperates with the notch 20 and so provides a sturdy, secure connection when the lenses are in the lowered position.

A modification is shown in Figs. 5–7 wherein the lens 11' is held in an eyewire 25 which is attached to the tubular member 26. The vertical bridge side 14' slidably receives the member 26 and has on its rear face notches 27 and 28 adapted to cooperate with a ridge 29 on spring 30 positioned between the rear face of side 14' and the rear wall of member 26. The arm 31 is positioned in an aperture 32 in the lower end of side 14' and is detachably secured by a set screw 33. The rearwardly extending arm 31, of course, carries a nose-engaging pad, not shown. It will be evident that the lens 11' can be selectively moved up and down on the bridge side 14' so as to position the lens for reading or distant vision. The spring 30 cooperating with the notches 27 or 28 will serve to lock the lens in the upper and lower positions, respectively. In its lower position, the member 26 also contacts with arm 31 which serves as a limiting stop. The bridge and arm may be taken apart by removing screw 33.

From the foregoing it will be apparent that I am able to attain the objects of my invention and provide an ophthalmic mounting which will permit of the selective raising or lowering of the lenses with respect to the fixed bridge. The invention can, of course, be applied to either rimless or rimmed spectacles or eyeglasses. The mounting is simple in structure, neat in appearance and convenient in operation. Various modifications can obviously be made without departing from the spirit of my invention as pointed out in the appended claim.

I claim:

In an ophthalmic mounting the combination of a bridge having a vertical side portion with a face provided with spaced notches, a tubular member slidably mounted on said side portion, a lens carried by said member, a resilient locking element carried by said member, said element being positioned between said face of the side portion and a wall of said tubular member and having a portion which is normally urged into locking engagement with a selected notch on said vertical side portion whereby the position of the lens may be selectively adjusted.

GERHARD A. ELLESTAD.